W. J. BOYLE, Sr.
CONTAINER.
APPLICATION FILED APR. 11, 1919.
Reissued July 29, 1919. 14,695.
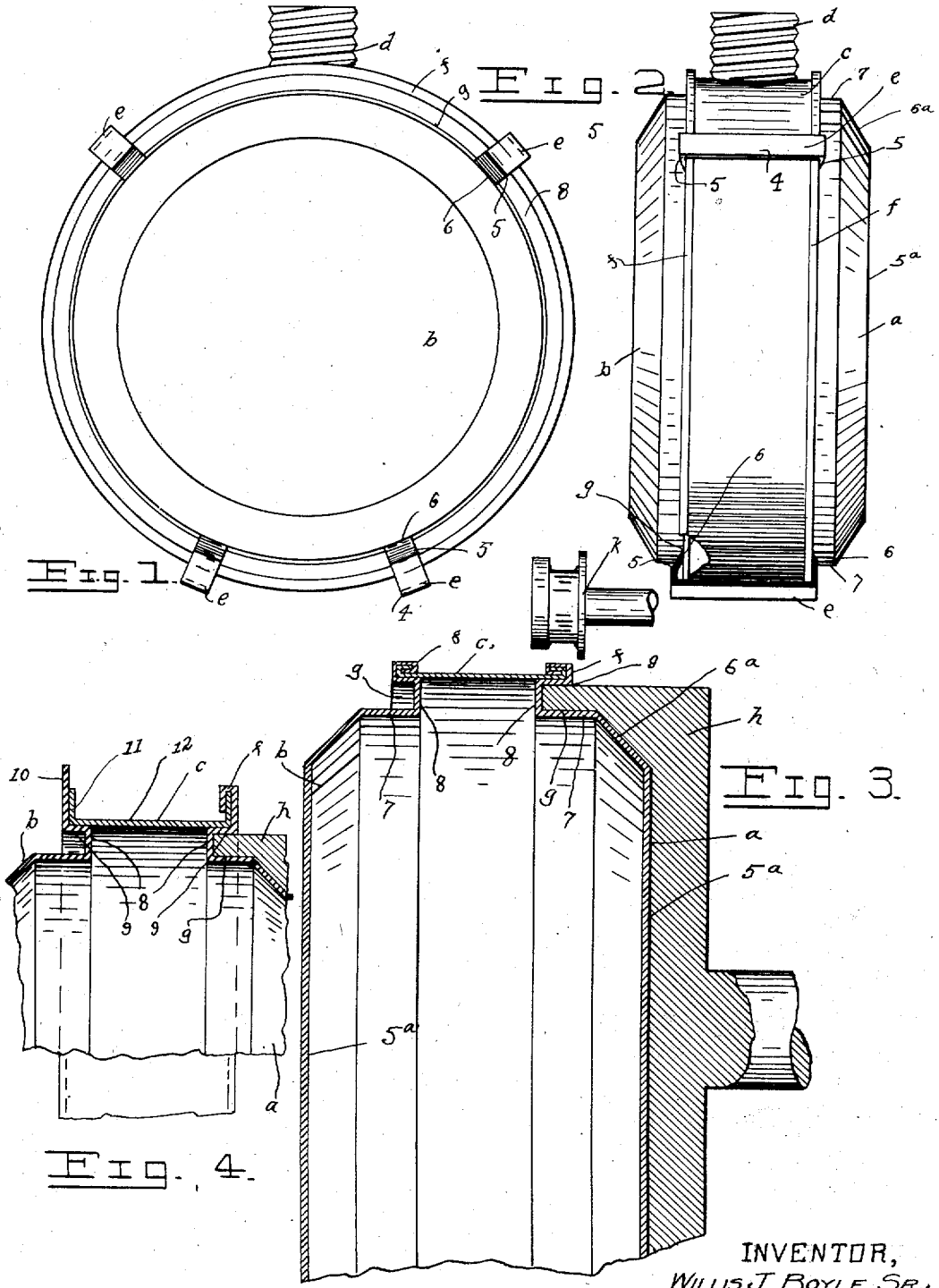
INVENTOR,
WILLIS J. BOYLE, SR.;
BY Raymond & Blakeslee,
HIS ATTORNEYS.

UNITED STATES PATENT OFFICE.

WILLIS J. BOYLE, SR., OF LOS ANGELES, CALIFORNIA.

CONTAINER.

14,695. Specification of Reissued Letters Patent. Reissued July 29, 1919.

Original No. 1,230,459, dated June 19, 1917, Serial No. 109,504, filed July 15, 1916. Application for reissue filed April 11, 1919. Serial No. 289,446.

*To all whom it may concern:*

Be it known that I, WILLIS J. BOYLE, Sr., a citizen of the United States, residing at Los Angeles, in the county of Los Angeles and State of California, have invented new and useful Improvements in Containers, of which the following is a specification.

This invention relates to containers and more particularly to canteens for carrying and dispensing water and other liquids, and it has for its object to provide a container construction which will be superior in point of inherent strength, prevention of leakage or dissipation of contents, simplicity and inexpensiveness in construction or manufacture and durability, all taken in consideration with compactness in form and containing capacity.

With the above and other objects in view, the invention consists in the provision, formation, construction, combination and interrelation of parts, members and features, all as hereinafter described, shown in the drawing and finally pointed out in claims.

In the drawing:

Figure 1 is a side elevation of a container constructed and organized and formed in accordance with the invention, the same being specifically a canteen for holding and dispensing liquids;

Fig. 2 is a side edge view of the canteen shown in Fig. 1;

Fig. 3 is an enlarged fragmentary and partially diagrammatic view, also partly in section, of features and parts of the canteen construction shown in Figs. 1 and 2 and of means and devices utilized in forming or assembling such parts and features of the canteen construction; and Fig. 4 is a view similar to Fig. 3 showing the parts and members of the canteen structure during the formation and assemblage of the same in a stage or stages earlier than illustrated in Fig. 3.

Corresponding parts in all the figures are designated by the same reference characters.

Referring with particularity to the drawing, the improved container or, specifically, the canteen therein disclosed, is shown as comprising two lateral body members *a* and *b* and an intermediate connecting body member *c*, such members together inclosing an internal space to which liquid is introduced and from which liquid may be dispensed through a threaded spout or outwardly projecting mouth *d* which surrounds a suitable orifice or opening produced through the intermediate body member *c*. Keepers or strap guides or members *e* are provided upon the container body, arching over the intermediate body member *c*, so as to suitably accommodate a strap between such keepers and the intermediate body member *c*, and likewise between seam-beads *f* provided or produced at the zones of junction of the members *a* and *b* respectively, and the intermediate members *c*. These keepers preferably consist each of a metallic plate or strip 4 the ends of which are bent at acute angles as at 5 and soldered or otherwise suitably connected at their extremities, as at 6, with the body members *a* and *b* respectively. These strips are bent inwardly at acute angles 5 at their ends and soldered as at 6 to the respective body members *a* and *b* in the inner angular portions of the channels *g* most remote from the body member *c*. The connection by soldering at these points is thus protected and rendered less liable to fracture or disturbance. These latter body members flare outwardly or laterally from the plane of the intermediate member *c* and this flare at its initiation produces, due to the peculiar arrangement and formation of parts hereinafter set forth, an annular channel or recess *g* over which the respective seam-bead *f* projects or is positioned. This channel is thus produced between the respective seam-bead and a portion of the respective body member *a* or *b*, and its provision permits of closely uniting the respective body member *a* or *b* to the body member *c*, in the body-forming or assembling operations, so that the necessity of using solder or other seam-closing substances is entirely avoided. In other words, the provision of this channel *g* permits of the application of a suitable chuck or jig *h* to the respective body member *a* or *b* in such position as to project within the respective channel *g* and to effectively maintain the structural integrity of such member *a* or *b* and the member *c* during the forming or bending or folding of the material of such members to produce the seam-bead *f*. Such chuck or the like *h* provides an efficient backing or bed against which the pressures of such forming operations are exerted, preventing the mis-shaping or collapsion of the parts or members. The body members are initially so formed as to provide for this channel *g* and the use of such chuck or jig, as will hereinafter be developed, and it has be found that without the provision of such channel the formation of a suitable seam or seam-bead to unite the body members, without using solder or the like, is practically impossible. Aside from the particular formation of the seam-bead, an important phase of the invention therefore consists in the provision of this channel or these channels *g*, or the structural combination of the body members *a* and *b* and *c* formed to provide the channels *g*, together with the over-hanging or over-lying seam-beads *f*.

In practising the invention, in the particular form shown in the drawing, each of the body members *a* and *b* comprises a circular central portion $5^a$ provided with an annular marginal portion $6^a$ directed inwardly at an angle from the central portion $5^a$, and a further annular marginal portion 7 directed inwardly from the portion $6^a$ at right angles to the portion $5^a$, and from which at right angles projects an annular marginal portion 8 provided with an annular marginal portion 9 overlying and parallel with the annular portion 7 so that the chamber *g* is formed and provided between such portions 7, 8 and 9. A final annular marginal portion 10 is provided upon the portion 9, at right angles to the portions 7 and 9 and parallel with the portion 8. The body member *c* is provided with lateral or marginal annular portions 11 outstanding from the main annular portion 12 of such member *c*, and which portions 11 are fitted against and within the portions 10 of the respective members *a* and *b*, when the member *c* is first put into position, the portion 12 of such members *c* being brought to bear upon the portions 9 of such members *a* and *b*. This arrangement is illustrated in Fig. 4 and particularly at the lefthand side of such figure. To produce the seam-bead *f* the chuck *h* is brought to bear upon the respective members *a* and *b* so that it intrudes in a close fit within the respective channel *g*. A suitable forming roll or tool is brought to bear upon the portion 10 of the respective member *a* or *b*, so as to bend the same inwardly and downwardly upon the adjacent portion 11 of the member *c*, into the relation shown at the righthand side of Fig. 4, the portion 10 being broader than the portion 11, so that it may overlap and almost entirely embrace the portion 11 as shown at the righthand side of Fig. 4. Another suitable forming roll or tool is then applied to the so partially-formed seam-bead and it is upset or bent or folded down onto the portion 12 of the member *c* as clearly shown in Fig. 3, all of the parts of the seam-bead, or all of the folds of the portions 9, 10, 11 and 12 entering into the same, being firmly compressed together to produce a tight joint proof against leakage. This performance is rendered possible by the fact that the chuck *h* backs up the operation, completely filling the channel *g* surrounded by the portions 7, 8 and 9, and permitting the portions 9, 10, 11 and 12 to be tightly pressed together upon such chuck, without collapsion of the parts which would otherwise occur were the aid of such chuck not possible due to the provision of the channel *g* to accommodate such chuck. It will be understood that the chuck *h* may be mounted upon a suitable center for rotation, and another suitable chuck may be applied to the other member *a* or *b*, so that such members and the member *c* may be revolved during the application of the forming roll or rolls of which one, for the final seam-bead forming operation, is shown at *k* in Fig. 3. It will be understood that both of the seam-beads *f* may be produced at the same time in the succession of operations described, by employing two sets of forming rolls or tools for operating upon the portions which eventually comprise such completed seam-bead.

The members or keepers *e* which are disposed at the nether or lower or bottom portion of the canteen likewise serve as feet or supports for the canteen, and enable the canteen to be stood in upright position as indicated in Figs. 1 and 2 of the drawing. With respect to this service as feet or supports, it is immaterial whether or not such two latter keepers perform any specific keeper function, namely, any function as keepers or strap guides. They may serve both as feet or supports and as keepers or strap guides, or only as keepers or strap guides or only as feet or supports, but an important office which they perform is to support the canteen firmly and positively and strongly in upright position. In performing this function they utilize all the advantages attaching to their formation and arrangement and the mode or means of connection with the canteen, such as the security and positiveness of connection resulting from the bending in of the ends of the metallic body strips 4 of which such parts *e* are constructed, and the soldering or hooking of the same or other connection of the same at their extremities, as at 6, with the body members *a* and *b* within the channels *g* which are formed between the portions 7, 8 and 9 of the respective body members *a* and *b*. This returning of the ends of the metallic strips 4 of the parts *e* and the securing of the same within the channels *g*, results in a most positive and secure attachment of such parts *e*, and likewise results in an effective bracing and binding and clamping together of the structural body members *a*, *b* and *c*, any tendency of the body members to become disassociated or to separate one from another being thus positively and effectively opposed and overcome, while the parts *e* are held firmly in place to perform their functions of keepers or strap-holders or guides or feet or supports, or any one or more of such functions.

The resultant container or canteen is thoroughly liquid-tight, and no solder or joint-filling substance in the seam beads is necessary to produce this result. Thus, the canteen or container may safely be heated to heat its contents without danger of opening the seams at the seam-beads. The discharge spout *d* may of course be suitably jointed to the member *c* without the use of solder or the like, for similar reasons.

The elimination of the necessity of using solder in the places mentioned of course eliminates one relatively expensive and laborious operation in sealing up the joints of the canteen, and the resultant article of manufacture obtained in practising the invention is inherently stronger and more durable than containers otherwise assembled, and has many superior advantages in utility, and is of a decorative and neat appearance. Provision of the flaring side member *a* which is necessary in order to obtain a canteen of suitable capacity for a given diameter or size, renders the provision of the essential channel *g* conveniently possible, providing one wall of such channel at the portion 7.

A container or canteen constructed and organized as described and shown in the drawing is, as pointed out, of great inherent strength and of great resistance to crushing strains applied to the lateral body members *a* and *b*, which afford effective truss action in these respects. So great is this inherent strength that it is not necessary to provide within the canteen the internal transverse brace or bridge which is found in canteens as today constructed and which is provided to prevent collapsion or crushing of the structure. The channel *g* provides a yielding or resilient quality in this truss action. This accommodates stresses or strains more effectively than would be the case if the side members were rigidly connected with the intermediate member or annular sheet metal body.

It is manifest that many advantages and variations and substitutions may be made in practising the invention, all with respect to the particular features shown in the drawing and hereinabove described, without departing from the true spirit of the invention or the terms of the following claims.

Having thus disclosed my invention, I claim and desire to secure by Letters Patent:

1. A canteen or like container, including an annular sheet metal body, side plates formed with peripheral outwardly opening channels of which the outer side walls telescope within the edges of the annular sheet metal body, the edges of the side plates and sheet metal body being connected by continuous seams, and keepers extending transversely across the annular sheet metal body and having the ends thereof returned and secured within the peripheral channels of the side plates.

2. A canteen or like container, including an annular sheet metal body, the same having side members formed with peripheral outwardly opening channels of which the outer side walls telescope within the annular sheet metal body, the edges of the side members and sheet metal body being connected by seams, and a metallic plate extending transversely across the sheet metal body and having the ends thereof returned and secured within the peripheral channels of the side members.

3. A canteen or like container, including an annular sheet metal body, the same having side members formed with peripheral outwardly opening channels of which the outer side walls telescope within the annular sheet metal body, the edges of the side members and sheet metal body being connected by seams, and a metallic plate extending transversely across the sheet metal body and having the ends thereof returned and secured within the peripheral channels of the side members; said metallic plates being disposed at the bottom portion of the canteen or container and serving to support the same in upright position.

4. A canteen or container, including a sheet metal body, and side members formed with peripheral outwardly opening channels of which the outer side walls telescope within the edges of the sheet metal body, and the edges of the side members and sheet metal body being connected by continuous seams; said side members comprising each an outer central portion $5^a$ provided with an annular marginal portion $6^a$ directed inwardly at an angle from said central portion $5^a$, and a further annular marginal portion 7 directed inwardly from the portion $6^a$ substantially at right angles to the portion $5^a$; said peripheral channels being provided with three angularly-related walls one of which consists of said annular marginal portion 7, and one of which is merged into the continuous seam of the respective side member; whereby each side member provides an effective truss action in transmitting to said sheet metal body stress or strain applied exteriorly to such side member.

5. A canteen or container, including a sheet metal body, and side members formed with peripheral outwardly opening channels of which the outer side walls telescope within the edges of the sheet metal body, and the edges of the side members and sheet metal body being connected by continuous seams; said side members comprising each an outer central portion $5^a$ provided with an annular marginal portion $6^a$ directed inwardly at an angle from said central portion $5^a$, and a further annular marginal portion 7 directed inwardly from the portion $6^a$ substantially at right angles to the portion $5^a$; said peripheral channels being provided with three angularly-related walls one of which consists of said annular marginal portion 7, and one of which is merged into the continuous seam of the respective side member; whereby each side member provides an effective truss action in transmitting to said sheet metal body stress or strain applied exteriorly to such side member; together with other members extending transversely across the sheet metal body and having the ends thereof returned and secured within the peripheral channels of the side members and serving to effectively transversely brace and strengthen the container.

6. A canteen or container, including a sheet metal body, and side members formed with peripheral outwardly opening channels of which the outer side walls telescope within the edges of the sheet metal body, the other walls of the channels being resilient in nature and providing a yielding quality at such channels, and the edges of the side members and sheet metal body being connected by continuous seams; said side members comprising each an outer central portion $5^a$ provided with an annular marginal portion $6^a$ directed inwardly at an angle from said central portion $5^a$, and a further annular marginal portion 7 directed inwardly from the portion $6^a$ at substantially right angles to the portion $5^a$; said peripheral channels being provided with three angularly-related walls one of which consists of said annular marginal portion 7, and one of which is merged into the continuous seam of the respective side member; whereby each side member provides an effective truss action in resiliently transmitting to said sheet metal body stress or strain applied exteriorly to such side member.

In testimony whereof, I have signed my name to this specification in the presence of two subscribing witnesses.

WILLIS J. BOYLE, Sr.

Witnesses:
Frank W. S. James,
J. Calvin Brown,